United States Patent
Nurminen et al.

(10) Patent No.: US 12,206,762 B2
(45) Date of Patent: Jan. 21, 2025

(54) COMPUTING DEVICE AND METHOD FOR GENERATING FINGERPRINT DATA HAVING AN OBFUSCATED LOCATION REFERENCE

(71) Applicant: HERE Global B.V., Eindhoven (NL)

(72) Inventors: Henri Jaakko Julius Nurminen, Tampere (FI); Marko Luomi, Lempäälä (FI); Pavel Ivanov, Tampere (FI); Lauri Aarne Johannes Wirola, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 291 days.

(21) Appl. No.: 18/053,455

(22) Filed: Nov. 8, 2022

(65) Prior Publication Data

US 2024/0154790 A1     May 9, 2024

(51) Int. Cl.
*H04L 9/08*    (2006.01)

(52) U.S. Cl.
CPC ........ *H04L 9/0819* (2013.01); *H04L 2209/16* (2013.01)

(58) Field of Classification Search
CPC .. H04L 9/0819; H04L 63/062; H04L 2209/16
USPC ........................................................ 380/270
See application file for complete search history.

(56) References Cited

U.S. PATENT DOCUMENTS

| | | | | |
|---|---|---|---|---|
| 11,115,814 B2* | 9/2021 | Khan | ..................... | H04L 9/0816 |
| 2016/0150380 A1* | 5/2016 | Han | ........................ | H04W 4/33 |
| | | | | 455/456.1 |
| 2016/0371394 A1* | 12/2016 | Shahidi | ............... | G01S 5/02526 |
| 2017/0171168 A1* | 6/2017 | Reshadi | .................. | G06F 21/64 |
| 2018/0035263 A1* | 2/2018 | Titus | ................... | G01S 5/02585 |
| 2019/0383896 A1* | 12/2019 | Han | ..................... | G01S 5/02525 |
| 2022/0036300 A1* | 2/2022 | Volkerink | ............. | H04W 84/18 |
| 2023/0276243 A1* | 8/2023 | Meidan | ............. | H04M 1/72463 |
| | | | | 726/4 |

* cited by examiner

*Primary Examiner* — Frantz B Jean
(74) *Attorney, Agent, or Firm* — Jason Wejnert; HERE GLOBAL B.V.

(57) ABSTRACT

A computing device, method and computer program product are provided to generate fingerprint data having an obfuscated location reference, thereby maintaining the privacy of the location information provided by fingerprint data and represented by a radio map. For a computing device configured to generate fingerprint data having an obfuscated location reference, the computing device is caused to receive fingerprint data comprising a location reference and measurement(s) of one or more communications nodes. The computing device is caused to determine translation and/or rotation parameter(s) based on a respective identifier of at least one of the one or more communications nodes and to apply one or more of the parameters at least to the location reference, thereby generating an obfuscated location reference. The computing device is also caused to provide the fingerprint data including the obfuscated location reference to another computing device for generation or updating of a radio map.

20 Claims, 5 Drawing Sheets

COMPUTING DEVICE AND METHOD FOR GENERATING FINGERPRINT DATA HAVING AN OBFUSCATED LOCATION REFERENCE

TECHNOLOGICAL FIELD

An example embodiment relates generally to the generation of fingerprint data having an obfuscated location reference and, more particularly, to a computing device, method and computer program product configured to obfuscate the location reference of fingerprint data by application of one or more translation and/or rotation parameters.

BACKGROUND

Radio maps are utilized for a variety of purposes including for positioning. By reference to a radio map, fingerprint data collected by user equipment, such as a cellular telephone, a smart phone, or other type of mobile device, can be associated with a particular position. Various types of radio maps may be utilized for positioning purposes including coverage area maps, node position maps, radio propagation maps, Rx maps, etc. as well as derivatives of one or more of the foregoing types of radio maps.

Radio maps be comprised of one or more radio modes and may be constructed from fingerprint data collected by users of various cellular and non-cellular positioning technologies. By way of example, cellular positioning technologies may include global systems for mobile communications (GSM), wideband code division multiple access (WCDMA), time division synchronous code division multiple access (TD-SCDMA), long term evolution (LTE), long term evolution-advanced (LTE-A), code division multiple access (CDMA), narrow band internet of things (NB-IoT), fifth generation (5G) New Radio (NR), etc., while non-cellular positioning technologies may include wireless local area networks (WLAN), Bluetooth (BT) wireless technology, Bluetooth low energy (BLE) wireless technology, ultra-wide band (UWB) communication protocol, etc.

The fingerprint data collected by the cellular and non-cellular positioning technologies may include a location reference and measurements of the radio environment at the particular location reference. The measurements of the radio environment may be obtained from radio interfaces of the user equipment and may be associated with an identifier of communication node that is providing the radio signals. With respect to cellular positioning technologies, the measurements may include the identifiers, such as global and/or local identifiers, of the communication node of the cellular network that is generating the signals observed by the user equipment. In some embodiments, the measurements may also include signal strength, path loss estimates and/or timing measurements, e.g., timing advance and/or round-trip time, of the cellular signals that are observed. With respect to non-cellular positioning technologies, the measurements may include an identifier of an access point, such as the basic service set identifier (B S SID) of a WLAN access point that is observed by the user equipment, such as the media access control (MAC) address of the air interface of the WLAN access point, and optionally one or more service set identifiers (S SIDS). In addition to the identifier, the measurements for non-cellular positioning technologies may include signal strength, receive signal strength index, physical Rx level, and/or one or more path loss estimates and timing measurements, such as roundtrip time. In some embodiments, the measurements provided by the fingerprint data may include other measurements of the environment, such as magnetic field measurements.

The fingerprint data in the form of a location reference and measurements of the radio environment captured at the respective location is then typically uploaded to a server or to the cloud. The server or the cloud can then analyze the fingerprint data to generate or update radio maps for the communication nodes, such as the cellular network cells and/or the wireless access points. based on fingerprint data received from a plurality of users, such as in a crowd-sourced system. The resulting radio maps may then be utilized for positioning purposes.

Fingerprint data may be considered to be sensitive data that contains information for which the privacy should be protected. In this regard, fingerprint data and the resulting radio maps may contain identifiers of private and public communication nodes and information regarding the amount and distribution of activity in different geographical areas. As such, various jurisdictions, such as various countries, require that fingerprint data and the resulting radio maps be encrypted to us to protect the underlying data from those who should not have access to the underlying data.

In some instances, fingerprint data is collected in one country and is then provided to a server in another country in order to generate or update radio maps based upon the collected fingerprint data. In order to generate or update the radio maps, fingerprint data that is encrypted prior to transmission to the server in another country must be decrypted by the server in order to generate or update the radio maps. The resulting radio maps may be returned to a positioning server and/or user equipment within the country in which the fingerprint data was originally collected with the radio maps, in some instances, being encrypted prior to being transmitted to the positioning server and/or the user equipment.

While encryption of the fingerprint data and/or the radio maps provides a degree of protection, some countries or other jurisdictions may ban the exportation of sensitive data including sensitive data of the type included in the fingerprint data and the resulting radio maps. In the instance in which fingerprint data and radio maps are banned from exportation, the fingerprint data may not be exported to a server in another country in order to generate or update the radio map. As such, a separate server would need to be provided in each country that bans the exportation of fingerprint data to generate or update the radio maps based on fingerprint data collected in the same country or other jurisdictions. The resulting proliferation of servers required for the generation and updating of radio maps would increase the costs associated with a positioning system. In addition, such country-specific radio maps provided by the servers located in the various countries would increase the complexity of positioning services available to user equipment in an instance in which the user equipment travels from one country to another country and must therefore access different radio maps from different servers in the different countries.

BRIEF SUMMARY

A computing device, method and computer program product are provided in an example embodiment in order to generate and use radio maps in a manner that maintains the security of the location information provided by the fingerprint data and represented by a radio map so as not to publicly expose the location information. As such, the processing of the fingerprint data and the use of the fingerprint data in conjunction with the generation and updating of one or more radio maps as provided by the computing device, method and computer program product of an example embodiment protects the privacy of the location information as the location information is transmitted and received, such as in the form of fingerprint data or the resulting radio maps. Consequently, the computing device, method and computer program product of an example embodiment allow for the transmission of fingerprint data to servers or other computer devices in countries other than the country in which the fingerprint data was collected for the generation or updating of the radio maps as well as the return of the resulting radio maps to a positioning server and/or user equipment in a different country, while complying with limitations on the exportation of sensitive data, such as location information, since the location information is protected and not exposed during the transmission and reception of the fingerprint data and the resulting radio maps.

In an example embodiment, a computing device is provided that is configured to generate fingerprint data having an obfuscated location reference. The computing device includes processing circuitry and at least one memory including computer program code with the at least one memory and the computer program code configured to, with the processing circuitry, cause the computing device at least to receive fingerprint data comprising a location reference and one or more measurements of one or more communications nodes. The at least one memory and the computer program code are also configured to, with the processing circuitry, cause the computing device to determine one or more translation and/or rotation parameters based on a respective identifier of at least one of the one or more communications nodes. The at least one memory and the computer program code are further configured to, with the processing circuitry, cause the computing device to apply one or more of the determined translation and/or rotation parameters at least to the location reference, thereby resulting in an obfuscated location reference that is a translated and/or rotated version of the location reference from the received fingerprint data. The at least one memory and the computer program code are additionally configured to, with the processing circuitry, cause the computing device to provide the fingerprint data including the obfuscated location reference to another computing device for use in generation or updating of a radio map.

The at least one memory and the computer program code are further configured to, with the processing circuitry, cause the computing device of an example embodiment to determine the one or more translation and/or rotation parameters utilizing a secret key for a respective communications node. In this example embodiment, the at least one memory and the computer program code may also be configured to, with the processing circuitry, cause the computing device to determine the one or more translation and/or rotation parameters by generating the one or more translation and/or rotation parameters using a hash function of the identifier of the respective communications node and the secret key.

The at least one memory and the computer program code are configured to, with the processing circuitry, cause the computing device of an example embodiment to apply the one or more of the determined translation and/or rotation parameters at least to the location reference by translating the location reference in one or more directions by a distance defined by the one or more determined translation parameters. Additionally or alternatively, the at least one memory and the computer program code may be configured to, with the processing circuitry, cause the computing device to apply the one or more of the determined translation and/or rotation parameters at least to the location reference by rotating the location reference by an angular amount defined by the one or more determined rotation parameter. In an example embodiment, the at least one memory and the computer program code are configured to, with the processing circuitry, cause the computing device to apply the one or more of the determined translation and/or rotation parameters at least to the location reference by mirroring the location reference about a reference defined by the one or more determined translation and/or rotation parameters.

The at least one memory and the computer program code are further configured to, with the processing circuitry, cause the computing device of an example embodiment to separate the fingerprint data that is received into single measurement fingerprint data. Each single measurement fingerprint data element includes the location reference and a measurement of a different one of the one or more communications nodes. In an example embodiment, the at least one memory and the computer program code are further configured to, with the processing circuitry, cause the computing device to obfuscate an identifier of the respective communications node using a secret key for the respective communications node and to provide the obfuscated identifier in conjunction with the fingerprint data including the obfuscated location reference from the respective communications node.

In an example embodiment, the fingerprint data includes a plurality of location references and one or more measurements of a respective communications node at each of the plurality of location references. As such, application of one or more of the determined translation and/or rotation parameters to the plurality of location references results in obfuscated location references that are translated and/or rotated versions of the plurality of location references. In this example embodiment, the obfuscated location references for the fingerprint data of the respective communications node has a same spacing therebetween as the location references for the fingerprint data that was received and to which one or more of the determined translation and/or rotation parameters were applied.

In another example embodiment, a method is provided for generating fingerprint data having an obfuscated location reference. The method includes receiving fingerprint data comprising a location reference and one or more measurements of one or more communications nodes and determining one or more translation and/or rotation parameters based on a respective identifier of at least one of the one or more communications nodes. The method also includes applying one or more of the determined translation and/or rotation parameters at least to the location reference, thereby resulting in an obfuscated location reference that is a translated and/or rotated version of the location reference from the received fingerprint data. The method further includes providing the fingerprint data including the obfuscated location reference to another computing device for use in generation or updating of a radio map.

The method of an example embodiment determines the one or more translation and/or rotation parameters by determining the one or more translation and/or rotation parameters utilizing a secret key for a respective communications node. In this example embodiment, determining the one or more translation and/or rotation parameters may include determining the one or more translation and/or rotation parameters using a hash function of the identifier of the respective communications node and the secret key. In an example embodiment, applying one or more of the determined translation and/or rotation parameters includes translating the location reference in one or more directions by a distance defined by the one or more determined translation parameters. Additionally or alternatively, applying one or more of the determined translation and/or rotation parameters includes rotating the location reference by an angular amount defined by the one or more determined rotation parameter. In another example embodiment, applying one or more of the determined translation and/or rotation parameters includes mirroring the location reference about a reference defined by the one or more determined translation and/or rotation parameters.

The method of an example embodiment also includes separating the fingerprint data that is received into single measurement fingerprint data. Each single measurement fingerprint data element includes the location reference and a measurement of a different one of the one or more communications nodes. In an example embodiment, the method also includes obfuscating the identifier of a respective communications node using a secret key for the respective communications node and providing the obfuscated identifier in conjunction with the fingerprint data including obfuscated location references from the respective communications node.

The fingerprint data of an example embodiment includes a plurality of location references and one or more measurements of a respective communications node at each of the plurality of location references. As such, application of one or more of the determined translation and/or rotation parameters to the plurality of location references results in obfuscated location references that are translated and/or rotated versions of the plurality of location references. In this example embodiment, the obfuscated location references for the fingerprint data of the respective communications node have a same spacing therebetween as the location references for the fingerprint data that was received and to which one or more of the determined translation and/or rotation parameters were applied.

In a further example embodiment, a computer program product is provided that is configured to generate fingerprint data. The computer program product includes at least one non-transitory computer-readable storage medium having computer-executable program code instructions stored therein with the computer-executable program code instructions including program code instructions configured to receive fingerprint data comprising a location reference and one or more measurements of one or more communications nodes. The computer-executable program code instructions also include program code instructions configured to determine one or more translation and/or rotation parameters based on a respective identifier of at least one of the one or more communications nodes. The computer-executable program code instructions further include program code instructions configured to apply one or more of the determined translation and/or rotation parameters at least to the location reference, thereby resulting in an obfuscated location reference that is a translated and/or rotated version of the location reference from the received fingerprint data. The computer-executable program code instructions additionally include program code instructions configured to provide the fingerprint data including the obfuscated location reference to another computing device for use in generation or updating of a radio map.

In an example embodiment, the program code instructions configured to determine the one or more translation and/or rotation parameters include program code instructions configured to determine the one or more translation and/or rotation parameters utilizing a secret key for a respective communications node. In this example embodiment, the program code instructions configured to determine the one or more translation and/or rotation parameters may include program code instructions configured to determine the one or more translation and/or rotation parameters using a hash function of the identifier of the respective communications node and the secret key. In an example embodiment, the program code instructions configured to apply one or more of the determined translation and/or rotation parameters include program code instructions configured to translate the location reference in one or more directions by a distance defined by the one or more determined translation parameters. Additionally or alternatively, the program code instructions configured to apply one or more of the determined translation and/or rotation parameters include, in an example embodiment, program code instructions configured to rotate the location reference by an angular amount defined by the one or more determined rotation parameter. In another example embodiment, the program code instructions configured to apply one or more of the determined translation and/or rotation parameters include program code instructions configured to mirror the location reference about a reference defined by the one or more determined translation and/or rotation parameters.

The computer-executable program code instructions of an example embodiment also include program code instructions configured to separate the fingerprint data that is received into single measurement fingerprint data. Each single measurement fingerprint data element includes the location reference and a measurement of a different one of the one or more communications nodes. In an example embodiment, the computer-executable program code instructions also include program code instructions configured to obfuscate the identifier of a respective communications node using a secret key for the respective communications node and to provide the obfuscated identifier in conjunction with the fingerprint data including obfuscated location references from the respective communications node.

The fingerprint data of an example embodiment includes a plurality of location references and one or more measurements of a respective communications node at each of the plurality of location references. As such, application of one or more of the determined translation and/or rotation parameters to the plurality of location references results in obfuscated location references that are translated and/or rotated versions of the plurality of location references. In this example embodiment, the obfuscated location references for the fingerprint data of the respective communications node have a same spacing therebetween as the location references for the fingerprint data that was received and to which one or more of the determined translation and/or rotation parameters were applied.

In yet another example embodiment, an apparatus is provided for generating fingerprint data having an obfuscated location reference. The apparatus includes means for receiving fingerprint data comprising a location reference and one or more measurements of one or more communications nodes and means for determining one or more translation and/or rotation parameters based on a respective identifier of at least one of the one or more communications nodes. The apparatus also includes means for applying one or more of the determined translation and/or rotation parameters at least to the location reference, thereby resulting in an obfuscated location reference that is a translated and/or rotated version of the location reference from the received fingerprint data. The apparatus further includes means for providing the fingerprint data including the obfuscated location reference to another computing device for use in generation or updating of a radio map.

The means for determining the one or more translation and/or rotation parameters may include means for determining the one or more translation and/or rotation parameters utilizing a secret key for a respective communications node. In this example embodiment, the means for determining the one or more translation and/or rotation parameters may include means for determining the one or more translation and/or rotation parameters using a hash function of the identifier of the respective communications node and the secret key. In an example embodiment, the means for applying one or more of the determined translation and/or rotation parameters include means for translating the location reference in one or more directions by a distance defined by the one or more determined translation parameters. Additionally or alternatively, the means for applying one or more of the determined translation and/or rotation parameters include means for rotating the location reference by an angular amount defined by the one or more determined rotation parameter. In another example embodiment, the means for applying one or more of the determined translation and/or rotation parameters includes means for mirroring the location reference about a reference defined by the one or more determined translation and/or rotation parameters.

The apparatus of an example embodiment also includes means for separating the fingerprint data that is received into single measurement fingerprint data. Each single measurement fingerprint data element includes the location reference and a measurement of a different one of the one or more communications nodes. In an example embodiment, the apparatus also includes means for obfuscating the identifier of a respective communications node using a secret key for the respective communications node and means for providing the obfuscated identifier in conjunction with the fingerprint data including obfuscated location references from the respective communications node.

The fingerprint data of an example embodiment includes a plurality of location references and one or more measurements of a respective communications node at each of the plurality of location references. As such, application of one or more of the determined translation and/or rotation parameters to the plurality of location references results in obfuscated location references that are translated and/or rotated versions of the plurality of location references. In this example embodiment, the obfuscated location references for the fingerprint data of the respective communications node have a same spacing therebetween as the location references for the fingerprint data that was received and to which one or more of the determined translation and/or rotation parameters were applied.

BRIEF DESCRIPTION OF THE FIGURES

Having thus described example embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A computing device, method and computer program product are provided in accordance with an example embodiment in order to generate and utilize obfuscated location references in conjunction with fingerprint data and/or radio maps, such as coverage area maps, node position maps, radio propagation maps, Rx maps, etc. as well as derivatives of one or more of the foregoing types of radio maps. As noted above, the fingerprint data collected by the cellular and non-cellular positioning technologies may include a location reference and measurements of the radio environment at the particular location reference. The measurements of the radio environment may be associated with an identifier of communication node that is providing the radio signals. With respect to cellular positioning technologies, the measurements may also include signal strength, path loss estimates and/or timing measurements, e.g., timing advance and/or round-trip time, of the cellular signals that are observed. With respect to non-cellular positioning technologies, the measurements may include an identifier of an access point, such as the BSSID of a WLAN access point that is observed by the user equipment, such as the MAC address of the air interface of the WLAN access point, and optionally one or more SSIDS. In addition to the identifier, the measurements for non-cellular positioning technologies may include signal strength, receive signal strength index, physical Rx level, and/or one or more path loss estimates and timing measurements, such as roundtrip time. By utilizing obfuscated location references, the computing device, method and computer program product avoid the exposure of location references in fingerprint data and the resulting radio maps to unauthorized third parties and support the exportation of fingerprint data and/or radio maps in a manner that preserves the privacy of the underlying location references.

For example, the computing device, method and computer program product of one example embodiment are configured to generate fingerprint data having an obfuscated location reference, thereby permitting the fingerprint data including the obfuscated location reference to be provided to another computing device, including, for example, a computing device in a different country, for use in generation or updating of a radio map without exposure of the underlying location reference. In another example embodiment, a computing device, method and computer program product are provided in order to generate or update a radio map based upon fingerprint data that includes an obfuscated location reference. The resulting radio map may then be provided to another computing device including, for example, a computing device in another country, for use in conjunction with positioning without exposing the underlying location references of the fingerprint data. In a further example embodiment, a computing device, method and computer program product are provided in order to determine a position, such as the position of a user or user equipment, based upon a radio map that includes or is based on obfuscated location references so as to avoid exposing the underlying location references. The computing device, method and computer program product of the various embodiments therefore address the privacy concerns associated with the location references of the fingerprint data and the resulting radio map and, as a result, may permit the fingerprint data and/or the radio maps to be exported, even in instances in which certain countries impose bans on exports of various types of sensitive information.

Figure 1:
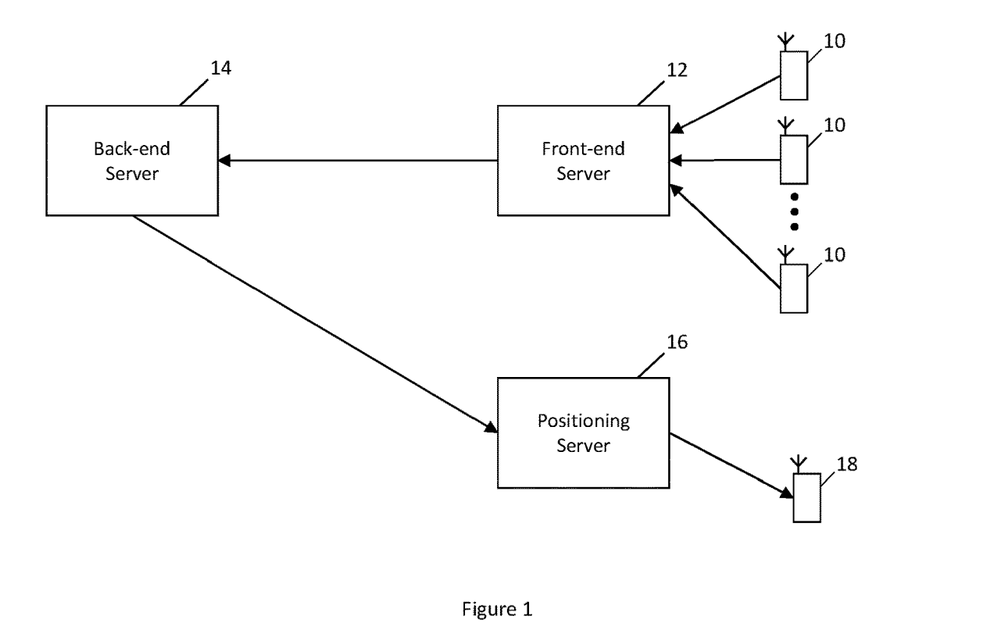
FIG. 1 is a system diagram illustrating the collection of fingerprint data by a plurality of user equipment and the generation or updating and the subsequent use of one or more radio maps based on the fingerprint data in accordance with an example embodiment of the present disclosure.

Referring now to FIG. 1, a system in accordance with an example embodiment is depicted. In a crowd-sourcing scenario, a plurality of user equipment 10 collect fingerprint data. The user equipment may be any of a wide variety of mobile devices including cellular telephones, smartphones, navigation systems, mapping systems, smart watches or other types of mobile terminals that are configured to determine their location and/or to receive input from a user that defines their location. The fingerprint data that is collected includes a location reference identifying the location of the user equipment at the time the fingerprint data was collected, identifiers of one or more communications nodes, such as cells of a cellular radio network, access nodes of a wireless network or the like, from which radio signals are transmitted that are then received by the user equipment at the time the fingerprint data was collected and one or more measurements of the radio signals generated by the one or more communications nodes.

In the illustrated embodiment, the user equipment 10 provide the fingerprint data to a front-end server 12. The front-end server obfuscates the location references of the fingerprint data, such as by applying one or more translation and/or rotation parameters to the location references of the fingerprint data provided by the user equipment. The system further includes a back-end server 14 that receives the fingerprint data including the obfuscated location references, but not the original location references from the front-end server. The back-end server then generates or updates a radio map based thereupon. As used herein, a radio map may be based on one or more radio models such that reference to a radio map also includes reference to a radio model.

In some instances, the user equipment 10 that collects the fingerprint data and the front-end server 12 that receives the fingerprint data and that obfuscates the location references may be in one country or jurisdiction and the back-end server 14 that generates or updates the radio map may be in another country or jurisdiction. By having obfuscated the location references of the fingerprint data prior to transmission of the fingerprint data to the back-end server, however, the privacy of the location references initially collected by the user equipment in conjunction with the fingerprint data is maintained. Thus, the fingerprint data with the obfuscated location references can be transmitted between the countries without violating any ban on the exportation of sensitive information by the country in which the user equipment and the front-end server are located and in which the fingerprint data was collected.

After generating or updating the radio map, the back-end server 14 may provide the resulting radio map to a positioning server 16 for use in providing positioning services to user equipment 18, which may be the same or different user equipment as the user equipment 10 that collected the fingerprint data. In an example embodiment, the radio map that is provided by the back-end server includes obfuscated location references and, as such, may be provided to the positioning server while maintaining the privacy in the underlying location references and without violating any ban on the exportation of sensitive information in an instance in which the back-end server and the positioning server are in different countries. Upon receipt of the radio map including the obfuscated location references, the positioning server is configured to deobfuscate the location references of the radio map prior to providing positioning services to the user equipment such that the location that is determined for the user equipment is no longer obfuscated. In one embodiment, the positioning server and the user equipment 18 for which the location is determined may be in the same country or jurisdiction such that the sharing or reliance upon location references that have been deobfuscated does not run afoul of any ban on the exportation of sensitive data. Although the front-end server 12, the back-end server and the positioning server are described above as servers, this description is provided by way of illustration and not of limitation since the front-end server, the back-end server and the positioning server may, instead, be any other type of computer or computer system in other embodiments Referring now to FIG. 2, a computing device 20 that may be configured in accordance with an example embodiment is depicted. Computing devices of the type depicted in FIG. 2 and described below may be embodied by the front-end server 12, the back-end server 14 and and/or the positioning server 16 in various embodiments. Regardless of the manner in which the computing device is embodied, the computing device includes processing circuitry 22, a memory device 24 and a communication interface 26.

Figure 2:
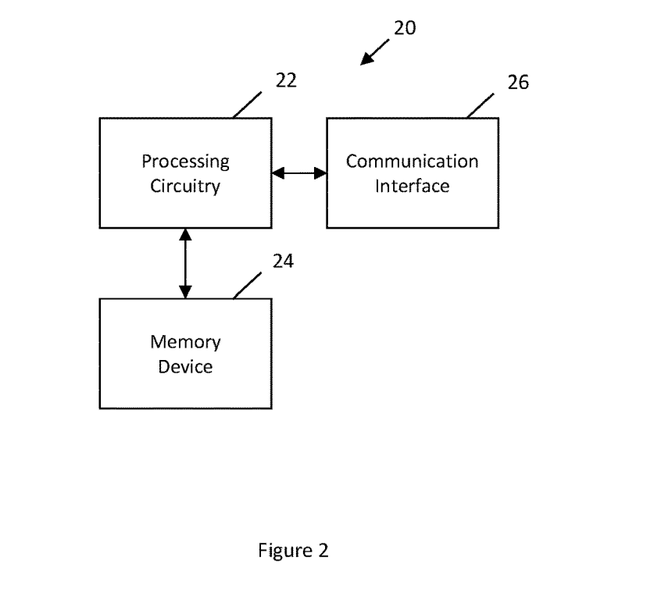
FIG. 2 is a block diagram of a computing device that may be embodied as a front-end server, a back-end server or a positioning server of the system of FIG. 1 and that may be configured in accordance with an example embodiment of the present disclosure.

In some embodiments, the processing circuitry 22 (and/or co-processors or any other processors assisting or otherwise associated with the processing circuitry) can be in communication with the memory device 24 via a bus for passing information among components of the computing device 20. The memory device can be non-transitory and can include, for example, one or more volatile and/or non-volatile memories. In other words, for example, the memory device may be an electronic storage device (for example, a computer readable storage medium) comprising gates configured to store data (for example, bits) that can be retrievable by a machine (for example, a computing device like the processing circuitry). The memory device can be configured to store information, data, content, applications, instructions, or the like for enabling the apparatus to carry out various functions in accordance with an example embodiment of the present disclosure. For example, the memory device can be configured to buffer input data for processing by the processing circuitry. Additionally or alternatively, the memory device can be configured to store instructions for execution by the processing circuitry.

The processing circuitry 22 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally or alternatively, the processing circuitry can include one or more processors configured in tandem via the bus to enable independent execution of instructions, pipelining and/or multithreading.

In an example embodiment, the processing circuitry 22 can be configured to execute instructions stored in the memory device 24 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, the front-end server 12, the back-end server 14, the positioning server 16 and/or the user equipment 18) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The computing device 20 of an example embodiment can also include the communication interface 26. The communication interface can be any means such as a device or circuitry embodied in either hardware or a combination of hardware and software that is configured to receive and/or transmit data from/to other electronic devices in communication with the computing device. The communication interface can be configured to communicate in accordance with various wireless protocols including Global System for Mobile Communications (GSM), such as but not limited to Long Term Evolution (LTE), Fifth-Generation (5G) telecommunications protocols or the like. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

Figure 3:
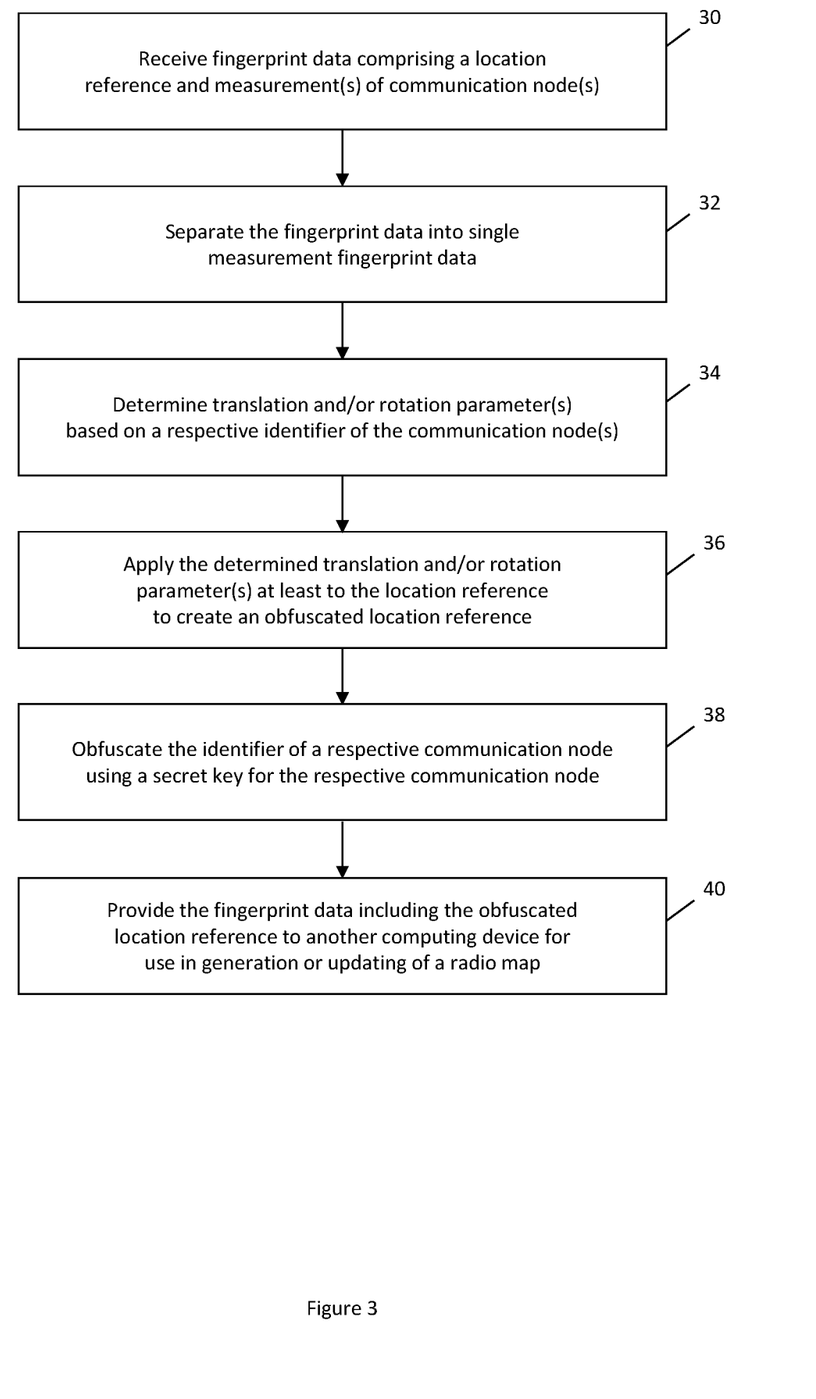
FIG. 3 is a flow chart illustrating the operations performed, such as by the computing device of FIG. 2 as embodied by a front-end server of the system of FIG. 1, in accordance with an example embodiment of the present disclosure.

Referring now to FIG. 3, the operations performed, such as by the computing device 20 of FIG. 2 as embodied by the front-end server 12, are depicted. As shown in block 30 of FIG. 3, the computing device includes means, such as the processing circuitry 22, the communication interface 26, or the like, for receiving fingerprint data from one or more user equipment 10. The fingerprint data includes a location reference identifying the location of the user equipment at the time at which the fingerprint data was collected. The location reference may be provided in various manners including as a latitude and longitude pair or the like. The fingerprint data that is provided also includes the identification of a communications node from which the user equipment receives radio signals, either directly or indirectly, such as via one or more intermediate devices and/or networks, at the time at which the fingerprint data is collected. The communications node may be a radio node of a cellular system, such as a particular cell of a cellular system, or a radio node of a wireless network, such as a wireless access node. The fingerprint data may identify only a single communications node, such as in an instance in which the radio signals captured by the user equipment at the time the fingerprint data is collected all originate from the same communications node. However, the fingerprint data that is provided by the user equipment in other instances may identify a plurality of communications nodes, each of which transmits radio signals that are captured by the user equipment at the time at which the fingerprint data is collected. For each communications node that is identified by the fingerprint data, the fingerprint data also includes one or more measurements of the radio signals provided by the respective communications node. Various types of measurements may be included within the fingerprint data including, for example, signal strength, pathloss estimates and/or timing measurements for cellular radio signals and/or service set identifiers, signal strength, pathloss estimates, and/or timing measurement for non-cellular radio signals, such as those transmitted by a wireless network.

In an instance in which the fingerprint data provided by a user equipment 10 includes measurements of a plurality of communications nodes, the computing device 20 includes means, such as the processing circuitry 22 or the like, for separating the fingerprint data that is received in the single measurement fingerprint data. See block 32 of FIG. 3. Each single measurement fingerprint data element includes the location reference, the identifier of a respective one of the plurality of communications nodes and one or more measurements of the radio signals transmitted by the respective communications node. Thus, each single measurement fingerprint data element is specific to a different one of the communications nodes identified by the fingerprint data collected by the user equipment and received by the computing device.

As shown in block 34 of FIG. 3, the computing device 20 of this example embodiment includes means, such as a processing circuitry 22 or the like, for determining one or more translation and/or rotation parameters based on the respective identifier of at least one of the communications nodes identified by the fingerprint data. In an instance in which the fingerprint data identifies a plurality of communications nodes, the computing device, such as the processing circuitry, separately determines one or more translation and/or rotation parameters for each communications node based upon the respective identifier of the respective communications node. Since each communications node has a different and unique identifier, the resulting translation and/or rotation parameters determined for a respective communications node are different than the translation and/or rotation parameters determined for the other communications nodes identified by the fingerprint data.

The computing device 20, such as the processing circuitry 22, may be configured to determine the one or more translation and/or rotation parameters for a respective communications node in various manners. In an example embodiment, however, the computing device includes means, such as the processing circuitry or the like, for determining the one or more translation and/or rotation parameters of a respective communications node utilizing a secret key for the respective communications node. The secret key may be generated by the computing device such as the processing circuitry, or may be a predefined secret key stored, for example, by the memory device 24 and accessed by the processing circuitry of the computing device. Although the secret key may in some embodiments be unique to a respective communications node, the secret key of other embodiments need not be unique to a respective communications node but instead the same secret key may be utilized in conjunction with two or more communications nodes. Regardless, once utilized for a communications node, the secret key may thereafter be associated with the communications node (and potentially one or more other communications nodes) for use therewith. In this example embodiment, the computing device may also include means, such as a processing circuitry or the like, for determining the one or more translation and/or rotation parameters by generating the one or more translation and/or rotation parameters using a function, such as a hash function, of the identifier of the respective communications node and the secret key. As such, in an instance in which the fingerprint data identifies a plurality of communications nodes, different translation and/or rotation parameters are generally generated for each communications node (or at least most communications nodes) as the combination, e.g., concatenation, of the unique identifier of the communications node and the secret key for the respective communications node differs from the combination of the identifier of the communications node and the secret key utilized in conjunction with other communications nodes, at least because of the different identifiers of the different communications nodes. In this regard, a hash function does not guarantee that two different inputs necessarily result in different outputs, but, makes it unlikely and, in some instances, very unlikely that two different inputs will result in the same output, particularly in an instance in which the identifiers of the communication nodes have a longer length.

As depicted in block 36 of FIG. 3, the computing device 20 of this example embodiment also includes means, such as the processing circuitry 22 or the like, for applying one or more of the determined translation and/or rotation parameters at least to the location reference of the fingerprint data. By applying the determined translation and/or rotation parameters to the location reference, an obfuscated location reference is generated that is a translated and/or rotated version of the location reference from the received fingerprint data. In an instance in which the fingerprint data includes fingerprint data for each of a plurality of communications nodes, the one or more translation and/or rotation parameters that are separately determined for each of the communications nodes are then also separately applied to the location reference such that a differently obfuscated location reference is generated (from the same location reference originally provided by the fingerprint data) for each communications node identified by the fingerprint data.

The computing device 20 of an example embodiment includes means, such as the processing circuitry 22 or the like, for applying the one or more of the determined translation and/or rotation parameters to the location reference by translating the location reference in one or more directions by a distance defined by the one or more determined translation parameters. For example, first and second translation parameters may be determined for first and second directions, respectively, such as X and Y directions or latitude and longitude directions. As such, the application of the determined translation parameters may translate the location reference in the first direction by an amount equal to the first translation parameter and in the second direction by an amount equal to the second translation parameter.

Additionally or alternatively, the computing device 20 of an example embodiment includes means, such as the processing circuitry 22 or the like, for applying the one or more the determined translation and/or rotation parameters to the location reference identified by the fingerprint data by rotating the location reference by an angular amount defined by the one or more determined rotation parameters. In this regard, the location reference may be rotated in a predefined direction, such as a clockwise or counterclockwise direction, by an angular amount defined by the determined rotation parameter.

Figure 4:
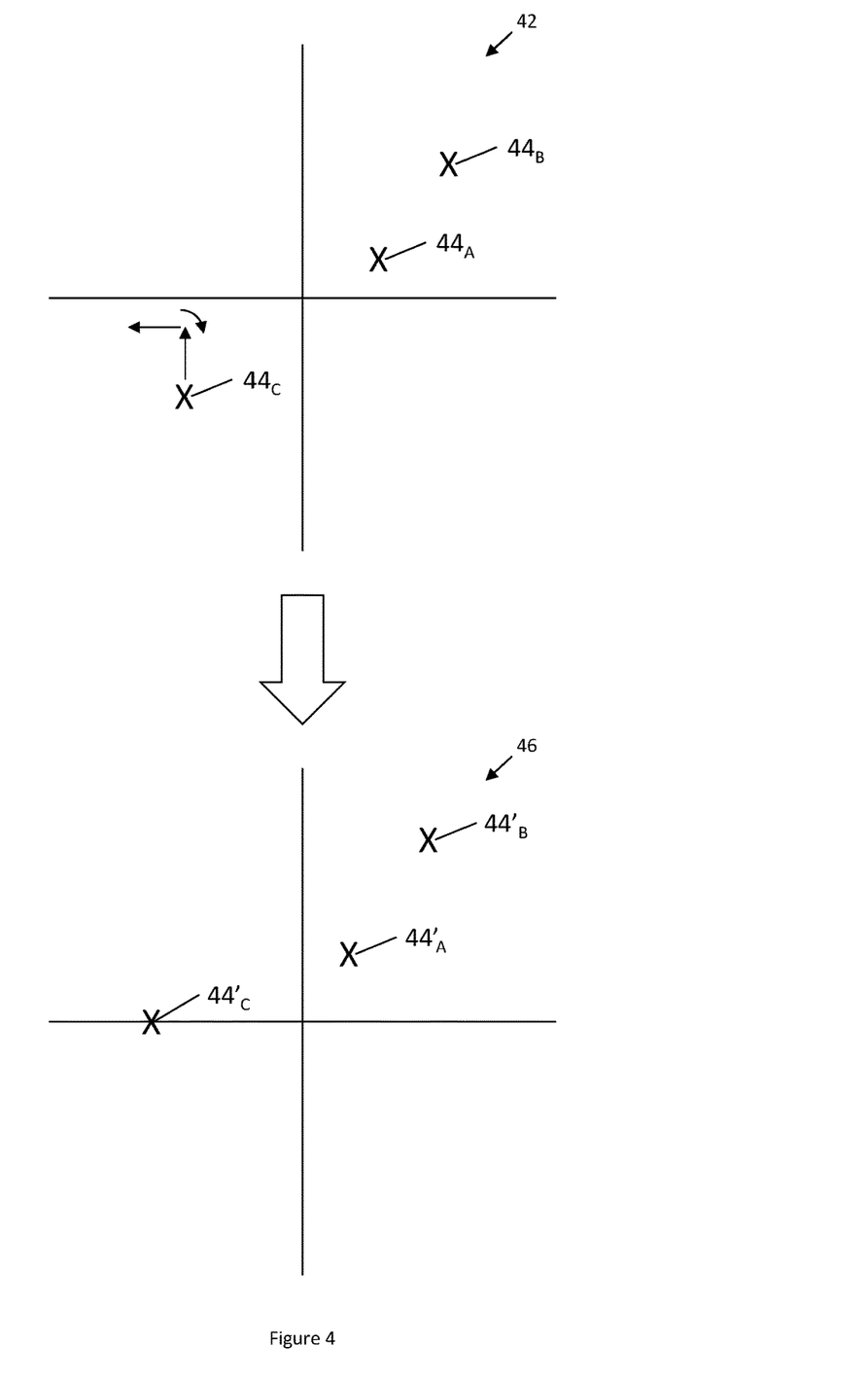
FIG. 4 is a graphical representation of the manner in which the location information may be translated and rotated in order to obfuscate the location information in accordance with an example embodiment of the present disclosure.

By way of example, but not of limitation, FIG. 4 depicts an instance in which fingerprint data is provided by first, second and third user equipment 10 to the front-end server 12. The fingerprint data provided by each of the user equipment includes measurements of the radio signals transmitted by the same communications node. However, the three user equipment that collect the fingerprint data are at different locations and, as such, the resulting fingerprint data has different location references as graphically represented in the coordinate system 42 with points $44_A$, $44_B$ and $44_C$ representing the location references in the fingerprint data provided by the first, second and third user equipment. In accordance with an example embodiment and as indicated by the arrows associated with point $44_C$, the location references $44_A$, $44_B$ and $44_C$ for the fingerprint data from the first, second and third user equipment are rotated by an angular amount in a clockwise direction and are translated by different amounts in the X and Y directions, thereby resulting in obfuscated location references depicted in the coordinate system 46 as obfuscated location references 44'A, 44'B and $44'_C$, respectively.

As each of the three location references in this example embodiment are associated with measurements by the respective user equipment 10 of the same communications node, each of the three location references have been translated and rotated in the same amount in order to be obfuscated. However, the location references captured by the same three user equipment in conjunction with measurements of different communications nodes would be translated and/or rotated by different amounts since the obfuscation is unique to a respective communications node.

As shown in FIG. 4, in an instance in which the fingerprint data includes a plurality of location references and one or more measurements of a respective communications node at each of the plurality of location references, the application of the one or more of the determined translation and/or rotation parameters to the plurality of location references results in obfuscated location references that are translated and/or rotated versions of the plurality of the location references. For location references associated with measurements from the same communications node, however, the spacing and relative positional relationship between the obfuscated location references remain the same as the spacing and relative positional relationship between the corresponding location references. In this regard and as also depicted in FIG. 4, the obfuscated location references from the fingerprint data for the same communications node have the same spacing therebetween as the location references from the original fingerprint data to which the one or more of the determined translation and/or rotation parameters were applied. Thus, although the locations of obfuscated location references 44'A, 44'B and 44'$_C$ are different than the corresponding location references 44$_A$, 44$_B$ and 44$_C$, the spacing therebetween, such in terms of x and y spacing, remains the same.

Although one example of the translation and rotation of the location references of fingerprint data has been described, the location reference of fingerprint data may be translated and/or rotated in other manners. For example, in another example embodiment, the computing device 20 includes means, such as the processing circuitry 22 or the like, for applying the one or more of the determined translation and/or rotation parameters at least to the location reference by mirroring the location reference about a reference, such as a reference point, a reference line or a reference plane, defined by the one or more determined translation and/or rotation parameters.

As shown in block 40 of FIG. 3, the computing device 20 of an example embodiment further includes means, such as the processing circuitry 22, the communication interface 26 or the like, for providing the fingerprint data including the obfuscated location reference (but not the original, unobfuscated location reference) to another computing device, such as the back-end server 16, for use in generation or updating of a radio map. The fingerprint data that is provided includes not only the obfuscated location reference, but an identification of one or more communications nodes in communication with the user equipment 10 at the time at which the fingerprint data is captured and one or more measurements of radio signals provided by the one or more communications nodes.

In order to further protect the fingerprint data that is provided to another computing device, such as the back-end server 14, the computing device 20 of an example embodiment also includes means, such as the processing circuitry 22 or the like, for obfuscating the identifier of a respective communications node using a secret key for the respective communications node. See block 38 of FIG. 3. For example, the secret key for the respective communications node may be the same secret key that is utilized to determine the translation and/or rotation parameters with which the location reference is to be obfuscated for the same respective communications node. Alternatively, a different secret key for the respective communications node may be utilized for obfuscating the identifier of the respective communications node in other examples embodiments. In this alternative embodiment in which a different secret key is utilized to obfuscate the identifier of the respective communications node, the computing device, such as the processing circuitry, may be configured to generate the secret key or the secret key may be predefined and stored, for example by the memory device 24 in a manner that is accessible by the processing circuitry. In either instance, the computing device such as the processing circuitry, the communication interface 26 or the like, of this example embodiment is configured to provide fingerprint data to the other computing device that includes not only an obfuscated location reference, but also an obfuscated identifier of the communications node as well as one or more measurements of the respective communications node. As noted above, the likelihood that a hash function generates different outputs for different inputs is increased as the length of the obfuscated identifier correspondingly increases. To avoid collisions in the obfuscated identifiers, the obfuscated identifier of one example embodiment may be configured to have approximately at least 2/π*[number of obfuscated communications nodes]$^2$ possible values. For example, if there are at most $2^{32}$ communications nodes (as uniquely defined by a 32-bit identifier), the obfuscated identifier may be configured to have $2^{64}$ possible values, as provided by a 64-bit identifier. Thus, the obfuscated identifier of some embodiments may have a longer length in order to increase the likelihood of generating unique outputs with the hash function.

Figure 5:
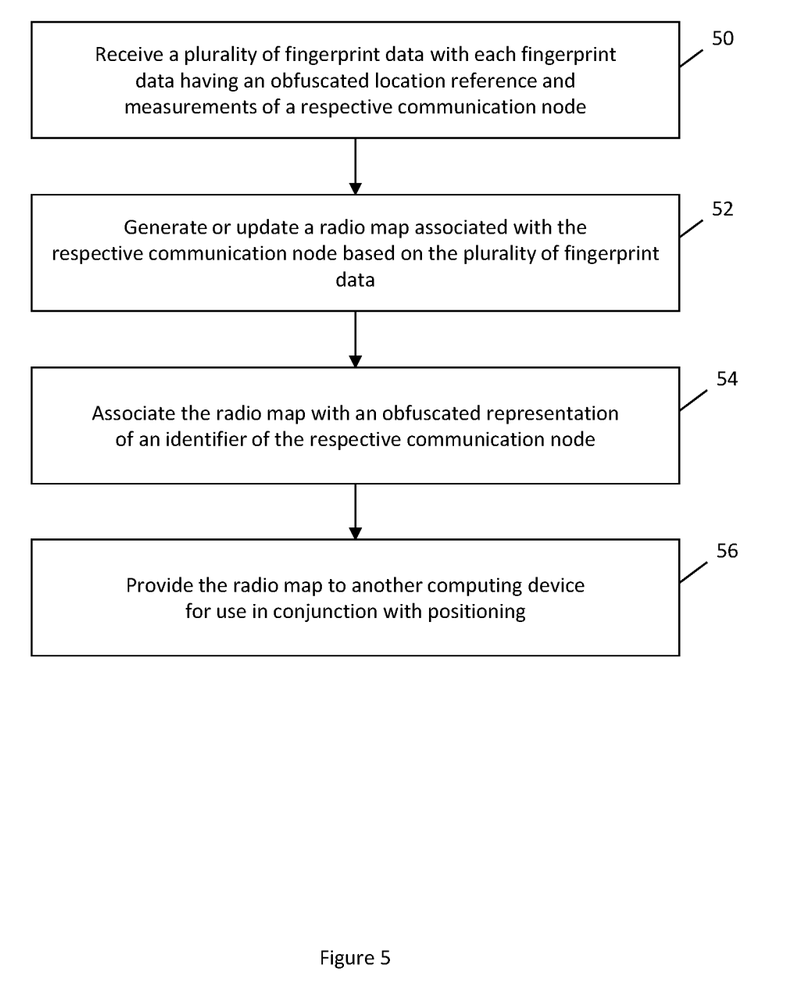
FIG. 5 is a flow chart illustrating the operations performed, such as by the computing device embodied as a back-end server of the system of FIG. 1, in accordance with an example embodiment of the present disclosure.

Referring now to FIG. 5, the operations performed, such as by the computing device 20 of FIG. 2 as embodied by a back-end server 14, are depicted. As shown in block 50, the computing device includes means, such as the processing circuitry 22, the communication interface 26 or the like, for receiving a plurality of fingerprint data, such as provided by the front-end server 12 of the system of FIG. 1. Each fingerprint data includes an obfuscated location reference, the identifier of one or more respective communications nodes and one or more measurements of the radio signals provided by each of the one or more respective communications nodes. As described above, the identifier of the one or more communications nodes may, in some embodiments, also be obfuscated. Each respective obfuscated location reference of the plurality of fingerprint data has been generated from a respective original location reference based on translation and/or rotation parameters that are unique to the respective communications node. As illustrated above in conjunction with FIG. 4, the obfuscated location references have the same spacing therebetween as the corresponding original location references that were obfuscated to generate the obfuscated location references. By way of example, the respective original location reference may be obfuscated by having been translated in one or more directions, such as in first and second directions, by distance(s) defined by one or more translation parameters that are unique to the respective communications node. Additionally or alternatively, a respective location reference may be obfuscated by having been rotated by an angular amount that is defined by one or more rotation parameters that are also unique to the respective communications node. The fingerprint data that is received in block 50 does not include the original, unobfuscated location reference, but, instead only includes the obfuscated location reference along with the identifier(s) of the communications node(s) and one or more measurements of the communications node(s).

As described above, the respective location reference for fingerprint data received, such as by the back-end server 14, may be obfuscated in a manner that is dependent upon a secret key for the respective communications node with which the one or more measurements of the fingerprint data are associated. In some example embodiments including, for example, embodiments in which the back-end server is in a different country or other jurisdiction than the front-end server 12 and/or the user equipment 10 that collected the fingerprint data, the computing device embodied, for example, by the back-end server may be unable to deobfuscate the obfuscated location reference since the computing device embodied by the back-end server does not have access to the secret key.

Referring now to block 52 of FIG. 5, the computing device 20 of this example embodiment also includes means, such as the processing circuitry 22 or the like, for generating or updating a radio map associated with the respective communications node for which the fingerprint data provides one or more measurements. In this regard, the radio map is generated or updated based on the plurality of the fingerprint data that each respectively includes an obfuscated location reference. Thus, the radio map is generated or updated on the basis of the obfuscated location references and not the original, unobfuscated location references.

In some example embodiments and as described above, a communications node may be identified by the fingerprint data in an obfuscated manner. In other words, the fingerprint data may include an obfuscated representation of the identifier of the respective communications node. In this example embodiment, the computing device 20 includes means, such as the processing circuitry 22 or the like, for associating the radio map that is generated or updated with the obfuscated representation of the identifier of the respective communications node. See block 54. As such, the resulting radio map is associated not with the actual identifier of the respective communications node, but with the obfuscated representation of the identifier of the communications node. Consequently, the computing device of this example embodiment, such as may be embodied by back-end server 14, need not be aware or informed of the actual identifier of the respective communications node, but can operate utilizing only the obfuscated representation of the identifier of the respective communications node, thereby further preserving the privacy associated with the identifier of the respective communications node. In this regard, as the identifier of the respective the respective communications node may be obfuscated, such as by the front-end server 12, in a manner that is dependent upon a secret key for the respective communications node, the back-end server of some example embodiments may be unable to deobfuscate the obfuscated identifier since the back-end server does not have access to the secret key.

As shown in block 56, the computing device 20 also includes means, such as the processing circuitry 22, the communication interface 26 or the like, for providing the radio map to another computing device for use in conjunction with positioning services. As described below and as shown in FIG. 1, the radio map may be provided to a positioning server 16 in order to provide positioning services to user equipment 18. As described above, the radio map includes reference to obfuscated location references, and not to the original, unobfuscated location references. Thus, the radio map may be provided to another computing device even in an instance in which the other computing device is in a different country or a different jurisdiction than the back-end server 14, since the obfuscation of the location references utilized by the radio map serve to protect and to preserve the privacy of the original location references.

Figure 6:
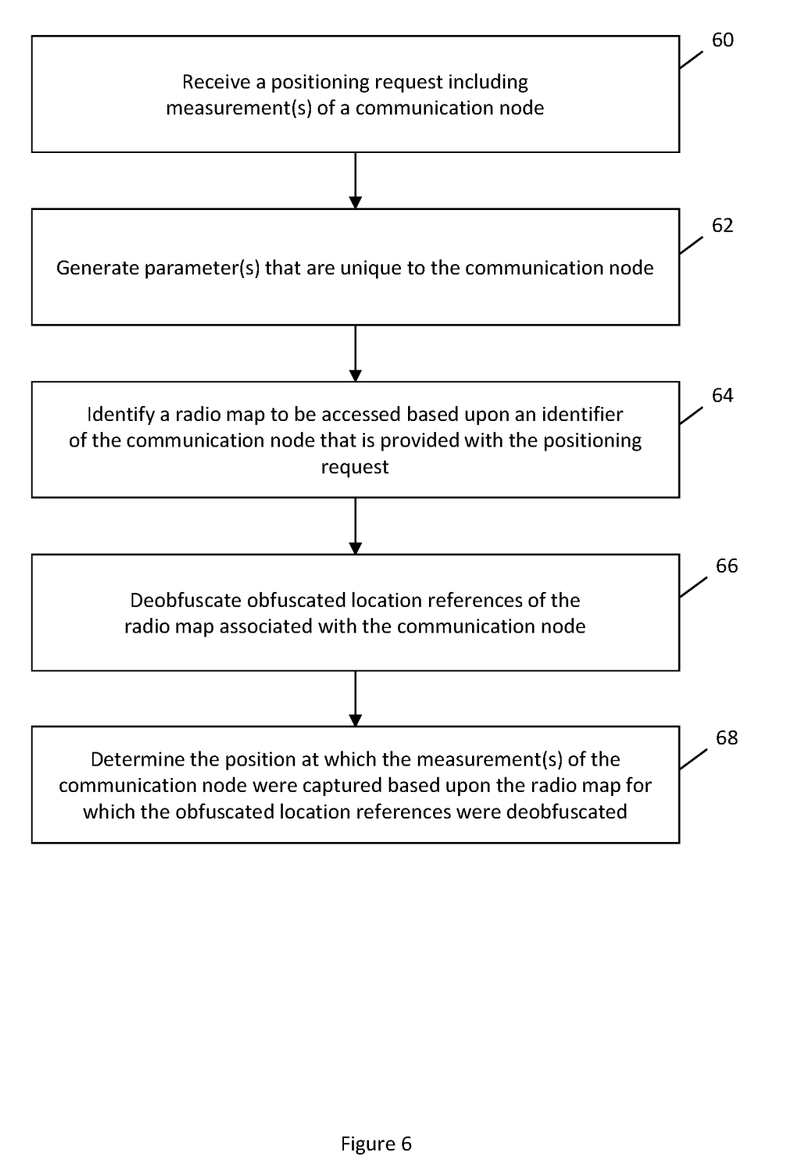
FIG. 6 is a flow chart illustrating the operations performed, such as by the computing device embodied as a positioning server of the system of FIG. 1, in accordance with an example embodiment of the present disclosure.

Referring now to FIG. 6, the operations performed, such as by the computing device 20 of FIG. 2 as embodied by a positioning server 18 in the system of FIG. 1, are depicted so as to determine a position based upon a radio map. In this example embodiment and as depicted in block 60 of FIG. 6, the computing device 20 includes means, such as the processing circuitry 22, the communication interface 26 or the like, for receiving a positioning request including one or more measurements of a communications node. By way of example, the positioning request may be provided by user equipment 18. The positioning request may provide the identifier of each of one or more communications nodes with which the user equipment is in communication at the time that the fingerprint data was captured, as well as one or more measurements captured by the user equipment from each of the communications nodes that were identified. However, the positioning request does not necessarily include location information associated with the user equipment and, instead, requests that the position of the user equipment be identified from the information provided by the positioning request relative to one or more radio maps.

As shown in block 62 of FIG. 6, the computing device 20 of this example embodiment includes means, such as the processing circuitry 22 or the like, for generating one or more parameters that are used unique to a communications node identified by the positioning request. In the regard, the one or more parameters that are generated that are unique to the communications node are the same parameters, e.g., one or more translation and/or rotation parameters, that were previously determined for the same communications node, such as by the front-end server 12, in conjunction with the obfuscation of the location reference of the fingerprint data collected by user equipment 10.

As described above, the computing device 20 of this example embodiment may include means, such as the processing circuitry 22 or the like, for generating the one or more parameters utilizing a secret key for the communications node. The secret key may be generated by the computing device, such as the processing circuitry, or may be predefined and stored, such as by memory device 24 in a manner that is accessible by the processing circuitry. In this example embodiment, the computing device may also include means, such as the processing circuitry or the like, for generating the one or more parameters using a function, such as a hash function, of the identifier of the communications node and the secret key. As at least the identifier of the communications node is unique to the communications node, the combination, e.g., concatenation, of the identifier and the secret key is unique such that the resulting one or more parameters that are generated are also generally unique to the respective communications node and typically differ from corresponding parameters generated for other communications nodes.

As shown in block 64, the computing device 20 of this example embodiment also includes means, such as the processing circuitry 22 or the like, for identifying the radio map to be accessed for positioning purposes based upon the identifier of the communications node as provided with the positioning request. As each radio map is associated with one or more communications nodes, the radio map is identified as the radio map that is associated with the same communications node that is identified by the positioning request. In some embodiments as described above, the identifier of the communications node that is associated with the radio map may be obfuscated. As such, the computing device of this example embodiment may also include means, such as the processing circuitry or the like, for deobfuscating the identifier of the communications node that is associated with the radio map in order to identify the radio map to be used for positioning purposes. Alternatively, the identifier of the communications node that is provided with the positioning request may be obfuscated by the computing device, such as the processing circuitry, in the same manner as described above in conjunction with the operations of block 38 of FIG. 3 in order to permit the resulting obfuscated identifier of the communications node provided with the positioning request to be matched with an obfuscated identifier of a communications node associated with a radio map.

As shown in block 66 of FIG. 6, the computing device 20 of this example embodiment also includes means, such as the processing circuitry 22 or the like, for deobfuscating the obfuscated location references of the radio map associated with the communications node. In this regard, the computing device, such as the memory device 24 of the computing device, may store a plurality of radio maps, each associated with one or more respective communications nodes, or the processing circuitry of the computing device may otherwise have access to the plurality of radio maps. For the radio map associated with the communications node identified by the positioning request, the obfuscated location references are deobfuscated based on the one or more parameters. In one example embodiment, the computing device includes means, such as the processing circuitry or the like, for deobfuscating the obfuscated location references of the radio map by translating the obfuscated location references in one or more directions, such as first and second directions, by respective distances defined by the one or more parameters, such as one or more translation parameters, e.g., first and second translation parameters. Additionally or alternatively, the computing device of this example embodiment may include means, such as the processing circuitry or the like, for deobfuscating the obfuscated location references of the radio map by rotating the obfuscated location references by an angular amount defined by the one or more parameters, such as a rotation parameter. Thus, with respect to the example of FIG. 4, the deobfuscation of the obfuscated location references serves to translate and rotate the obfuscated location references $44'_A$, $44'_B$ and $44'_C$ of coordinate system 46 to corresponding location references $44_A$, $44_B$, and $44_C$, respectively, of coordinate system 42.

In some embodiments, the positioning request may include measurements of a plurality of communications nodes. In this instance, the computing device 20 may include means, such as the processing circuitry 22 or the like, for repeating the generation of one or more parameters that are unique to a respective communications node for each of the plurality of communications nodes and then repeating the deobfuscation of the obfuscated location references of the radio map associated with the respective communications nodes separately for each of the plurality of communications nodes. As the one or more parameters that are generated are unique to respective communications nodes, the manner in which the obfuscated location references of a radio map associated with one communications node are deobfuscated differs from the manner in which the obfuscated location references of another radio map associated with a different communications node are deobfuscated, thereby further preserving the privacy associated with the location references.

As shown in block 68 of FIG. 6, the computing device 20 of this example embodiment also includes means, such as the processing circuitry 22 or the like, for determining the position at which the one or more measurements of the communications node that were included in the positioning request were captured by the user equipment 18 based upon the radio map for which the obfuscated location references have been deobfuscated. By way of example, the one or more measurements of the communications node captured by the user equipment 18 may be compared to the anticipated or historical measurements reflected by the radio map for the same communications node at different locations with the position of the user equipment 18 being determined to be that position for which the actual measurements must closely match the measurements reflected by the radio map.

In some embodiments in which the positioning request includes one or more measurements of each of a plurality of communications nodes captured by the user equipment 18 at the same position, the computing device 20 includes means, such as the processing circuitry 22 or the like, for determining the position at which the one or more measurements of the plurality of communications nodes were captured based upon the radio maps associated with the plurality of communications nodes for which the obfuscated location references have been deobfuscated, such as a first radio map associated with a first communications node, a second radio map associated with a second communications node, etc. With respect to the deobfuscation of the obfuscated location references utilized by the different maps, the computing device, such as the processing circuitry, is configured to utilize different parameter(s) for the deobfuscation of the obfuscated location references of the radio maps associated with each different communications node since the parameters utilized for obfuscation and deobfuscation are unique to a respective communications node. As such, the position of the user equipment 18 may be further refined in this example embodiment based upon the reliance upon the plurality of radio maps associated with the plurality of communications nodes.

The computing device 20 may also include means, such as the processing circuitry 22, the communication interface 26 or the like, for providing the position that is determined by reference to the radio map(s) to the user equipment 18. By providing the position to the user equipment, mapping, navigation and other positioning applications of the user equipment are supported as well as improving the general spatial awareness for the user of the user equipment. Moreover, the computing device, method and computer program product of the various embodiments preserve the privacy associated with the location references of the fingerprint data and the resulting radio maps and, as a result, may permit the fingerprint data and/or the radio maps to be exported, even in instances in which certain countries impose bans on exports of various types of sensitive information.

As described above, FIGS. 3, 5 and 6 are flow diagrams of a computing device 20, method, and computer program product configured in accordance with various aspects of the present disclosure. It will be understood that each block of the flow diagrams, and combinations of blocks in the flow diagrams, may be implemented by various means, such as hardware, firmware, processing circuitry 22, and/or other devices associated with execution of software including one or more computer program instructions. For example, one or more of the procedures described above may be embodied by computer program instructions. In this regard, the computer program instructions which embody the procedures described above may be stored by the memory device 24 of the computing device and executed by the processing circuitry or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the blocks of the flow diagrams. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the blocks of the flow diagrams.

Accordingly, blocks of the flow diagrams support combinations of means for performing the specified functions and combinations of operations for performing the specified functions. It will also be understood that one or more blocks of the flow diagrams, and combinations of blocks in the flow diagrams, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. For example, although described above in conjunction with a positioning server 16 distinct from a user equipment 18 that provides positioning services, the positioning server may be embodied by the user equipment in other example embodiments such that the user equipment is also configured to perform the functions described above, such as in relation to FIG. 6. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computing device configured to generate fingerprint data having an obfuscated location reference, the computing device comprising processing circuitry and at least one memory including computer program code, the at least one memory and the computer program code configured to, with the processing circuitry, cause the computing device at least to:
   receive fingerprint data comprising a location reference and one or more measurements of one or more communications nodes;
   determine one or more translation and/or rotation parameters based on a respective identifier of at least one of the one or more communications nodes;
   apply one or more of the determined translation and/or rotation parameters at least to the location reference, thereby resulting in an obfuscated location reference that is a translated and/or rotated version of the location reference from the received fingerprint data; and
   provide the fingerprint data including the obfuscated location reference to another computing device for use in generation or updating of a radio map.

2. A computing device according to claim 1 wherein the at least one memory and the computer program code are further configured to, with the processing circuitry, cause the computing device to determine the one or more translation and/or rotation parameters utilizing a secret key for a respective communications node.

3. A computing device according to claim 2 wherein the at least one memory and the computer program code are configured to, with the processing circuitry, cause the computing device to determine the one or more translation and/or rotation parameters by generating the one or more translation and/or rotation parameters using a hash function of the identifier of the respective communications node and the secret key.

4. A computing device according to claim 1 wherein the at least one memory and the computer program code are configured to, with the processing circuitry, cause the computing device to apply the one or more of the determined translation and/or rotation parameters at least to the location reference by translating the location reference in one or more directions by a distance defined by the one or more determined translation parameters.

5. A computing device according to claim 1 wherein the at least one memory and the computer program code are configured to, with the processing circuitry, cause the computing device to apply the one or more of the determined translation and/or rotation parameters at least to the location reference by rotating the location reference by an angular amount defined by the one or more determined rotation parameters.

6. A computing device according to claim 1 wherein the at least one memory and the computer program code are configured to, with the processing circuitry, cause the computing device to apply the one or more of the determined translation and/or rotation parameters at least to the location reference by mirroring the location reference about a reference defined by the one or more determined translation and/or rotation parameters.

7. A computing device according to claim 1 wherein the at least one memory and the computer program code are further configured to, with the processing circuitry, cause the computing device to separate the fingerprint data that is received into single measurement fingerprint data, wherein each single measurement fingerprint data element comprises the location reference and a measurement of a different one of the one or more communications nodes.

8. A computing device according to claim 1 wherein the at least one memory and the computer program code are further configured to, with the processing circuitry, cause the computing device to obfuscate an identifier of the respective communications node using a secret key for the respective communications node and to provide the obfuscated identifier in conjunction with the fingerprint data including the obfuscated location reference from the respective communications node.

9. A computing device according to claim 1 wherein the fingerprint data comprises a plurality of location references and one or more measurements of a respective communications node at each of the plurality of location references such that application of one or more of the determined translation and/or rotation parameters to the plurality of location references results in obfuscated location references that are translated and/or rotated versions of the plurality of location references, and wherein the obfuscated location references for the fingerprint data of the respective communications node have a same spacing therebetween as the location references for the fingerprint data that was received and to which one or more of the determined translation and/or rotation parameters were applied.

10. A method for generating fingerprint data having an obfuscated location reference, the method comprising:
receiving fingerprint data comprising a location reference and one or more measurements of one or more communications nodes;
determining one or more translation and/or rotation parameters based on a respective identifier of at least one of the one or more communications nodes;
applying one or more of the determined translation and/or rotation parameters at least to the location reference, thereby resulting in an obfuscated location reference that is a translated and/or rotated version of the location reference from the received fingerprint data; and
providing the fingerprint data including the obfuscated location reference to another computing device for use in generation or updating of a radio map.

11. A method according to claim 10 wherein determining the one or more translation and/or rotation parameters comprises determining the one or more translation and/or rotation parameters utilizing a secret key for a respective communications node.

12. A method according to claim 11 wherein determining the one or more translation and/or rotation parameters comprises determining the one or more translation and/or rotation parameters using a hash function of the identifier of the respective communications node and the secret key.

13. A method according to claim 10 wherein applying one or more of the determined translation and/or rotation parameters comprises translating the location reference in one or more directions by a distance defined by the one or more determined translation parameters.

14. A method according to claim 10 wherein applying one or more of the determined translation and/or rotation parameters comprises rotating the location reference by an angular amount defined by the one or more determined rotation parameters.

15. A method according to claim 10 wherein applying one or more of the determined translation and/or rotation parameters comprises mirroring the location reference about a reference defined by the one or more determined translation and/or rotation parameters.

16. A method according to claim 10 further comprising separating the fingerprint data that is received into single measurement fingerprint data, wherein each single measurement fingerprint data element comprises the location reference and a measurement of a different one of the one or more communications nodes.

17. A method according to claim 10 further comprising obfuscating the identifier of a respective communications node using a secret key for the respective communications node and providing the obfuscated identifier in conjunction with the fingerprint data including the obfuscated location references from the respective communications node.

18. A method according to claim 10 wherein the fingerprint data comprises a plurality of location references and one or more measurements of a respective communications node at each of the plurality of location references such that application of one or more of the determined translation and/or rotation parameters to the plurality of location references results in obfuscated location references that are translated and/or rotated versions of the plurality of location references, and wherein the obfuscated location references for the fingerprint data of the respective communications node have a same spacing therebetween as the location references for the fingerprint data that was received and to which one or more of the determined translation and/or rotation parameters were applied.

19. A computer program product configured to generate fingerprint data, the computer program product comprising at least one non-transitory computer-readable storage medium having computer-executable program code instructions stored therein, the computer-executable program code instructions including program code instructions configured to:
receive fingerprint data comprising a location reference and one or more measurements of one or more communications nodes;
determine one or more translation and/or rotation parameters based on a respective identifier of at least one of the one or more communications nodes;
apply one or more of the determined translation and/or rotation parameters at least to the location reference, thereby resulting in an obfuscated location reference that is a translated and/or rotated version of the location reference from the received fingerprint data; and
provide the fingerprint data including the obfuscated location reference to another computing device for use in generation or updating of a radio map.

20. A computer program product according to claim 19 wherein the fingerprint data comprises a plurality of location references and one or more measurements of a respective communications node at each of the plurality of location references such that application of one or more of the determined translation and/or rotation parameters to the plurality of location references results in obfuscated location references that are translated and/or rotated versions of the plurality of location references, and wherein the obfuscated location references for the fingerprint data of the respective communications node have a same spacing therebetween as the location references for the fingerprint data that was received and to which one or more of the determined translation and/or rotation parameters were applied.

* * * * *